United States Patent
Lee et al.

(10) Patent No.: US 10,327,244 B2
(45) Date of Patent: Jun. 18, 2019

(54) D2D RELAY METHOD OF TERMINAL IN WIRELESS COMMUNICATION SYSTEM, AND APPARATUS THEREFOR

(71) Applicant: LG Electronics Inc., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 15/511,889

(22) PCT Filed: Sep. 21, 2015

(86) PCT No.: PCT/KR2015/009876
§ 371 (c)(1),
(2) Date: Mar. 16, 2017

(87) PCT Pub. No.: WO2016/043566
PCT Pub. Date: Mar. 24, 2016

(65) Prior Publication Data
US 2017/0303282 A1    Oct. 19, 2017

Related U.S. Application Data

(60) Provisional application No. 62/053,202, filed on Sep. 21, 2014.

(51) Int. Cl.
*H04B 7/14* (2006.01)
*H04W 72/04* (2009.01)
(Continued)

(52) U.S. Cl.
CPC .... *H04W 72/0453* (2013.01); *H04B 7/15542* (2013.01); *H04W 76/10* (2018.02); *H04W 88/04* (2013.01); *H04W 92/18* (2013.01)

(58) Field of Classification Search
CPC . H04W 72/0453; H04W 76/10; H04W 88/04; H04W 92/18; H04B 7/15542
(Continued)

(56) References Cited

U.S. PATENT DOCUMENTS

2010/0254295 A1* 10/2010 Ahn .................. H04N 21/2383
                                                                370/312
2011/0134827 A1    6/2011 Hooli et al.
(Continued)

FOREIGN PATENT DOCUMENTS

WO    2014058221 A2    4/2014
WO    2014133356 A1    9/2014

OTHER PUBLICATIONS

Zte: "On D2D UE capability, D2D interest and prioritization", 3GPP TSG-RAN WG2 Meeting #87, R2-143596, Aug. 18-22, 2014.

*Primary Examiner* — Sai Ming Chan
(74) *Attorney, Agent, or Firm* — Dentons US LLP

(57) ABSTRACT

The present invention relates to a method and an apparatus for relay of a first device-to-device (D2D) terminal in a wireless communication system. Specifically, the present invention comprises the steps of: receiving settings regarding a D2D terminal group for single frequency network (SFN) relay; and performing SFN relay using a first resource pool set for SFN relay, wherein the first resource pool is set to be different from a second resource pool for D2D signal transmission of the first D2D terminal to a second D2D terminal.

9 Claims, 12 Drawing Sheets

(51) Int. Cl.
*H04W 88/04* (2009.01)
*H04W 76/10* (2018.01)
*H04B 7/155* (2006.01)
*H04W 92/18* (2009.01)

(58) Field of Classification Search
USPC .......................................................... 370/315
See application file for complete search history.

(56) References Cited

U.S. PATENT DOCUMENTS

| | | | |
|---|---|---|---|
| 2013/0343346 A1* | 12/2013 | Chen | H04W 72/082 370/332 |
| 2014/0171062 A1 | 6/2014 | Fallgren et al. | |
| 2015/0045018 A1* | 2/2015 | Liu | H04L 1/00 455/426.1 |
| 2015/0245334 A1* | 8/2015 | Chang | H04W 76/14 370/329 |
| 2016/0044733 A1* | 2/2016 | Soriaga | H04W 24/08 370/329 |
| 2016/0183276 A1* | 6/2016 | Marinier | H04W 72/02 370/329 |
| 2017/0142741 A1* | 5/2017 | Kaur | H04W 76/18 |
| 2017/0163470 A1* | 6/2017 | Seo | H04W 76/14 |
| 2018/0020459 A1* | 1/2018 | Chatterjee | H04W 76/18 |

\* cited by examiner

FIG. 2
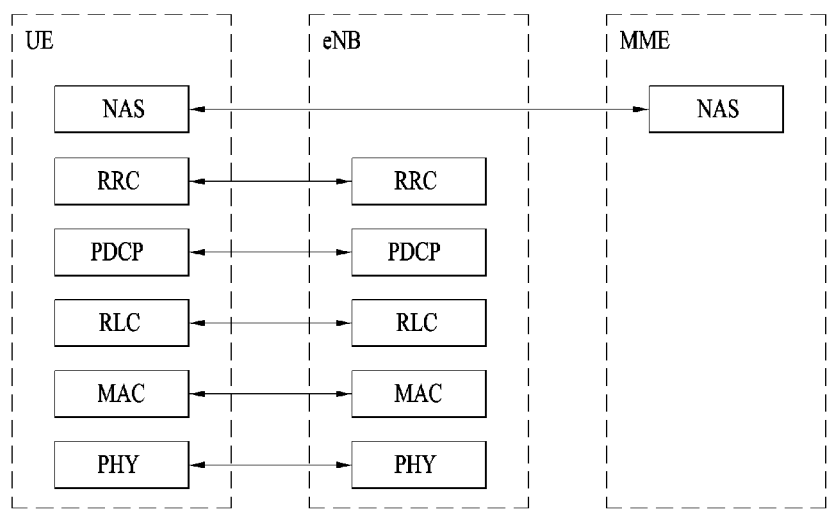
(A) Control-plane protocol stack
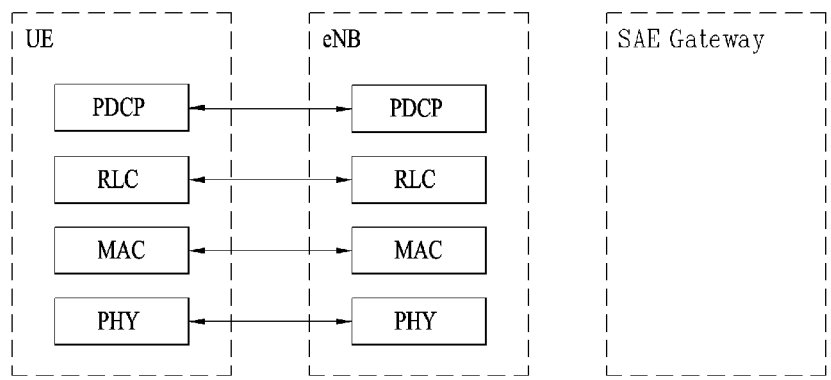
(B) User-plane protocol stack FIG. 8
(a) 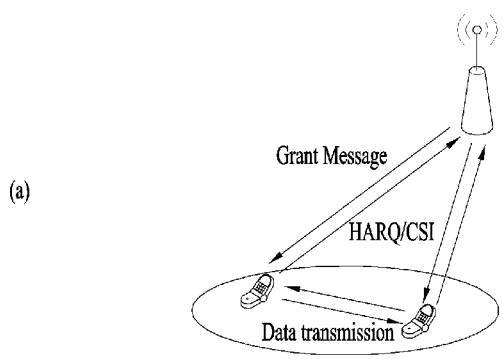
(b) 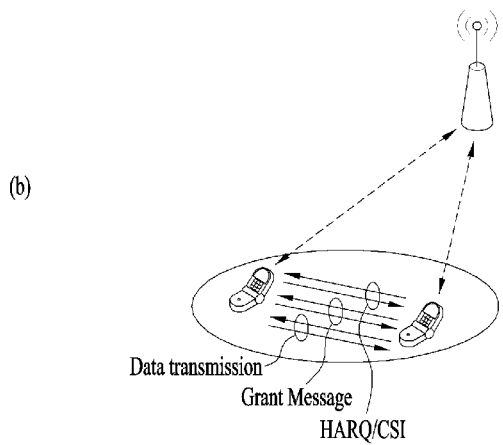

FIG. 9
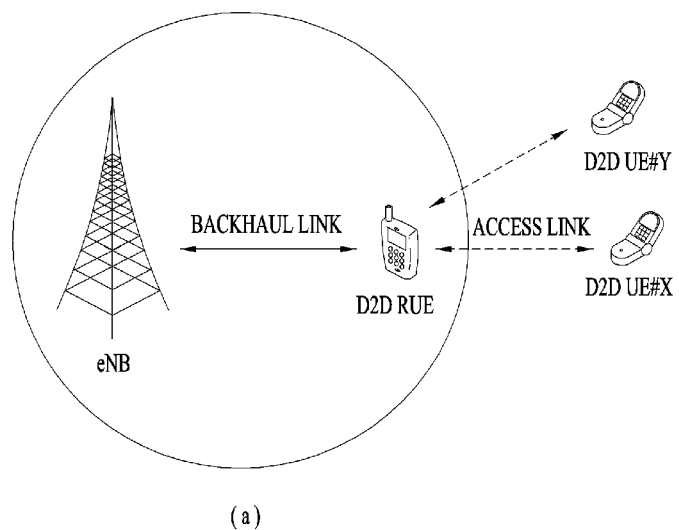
(a)
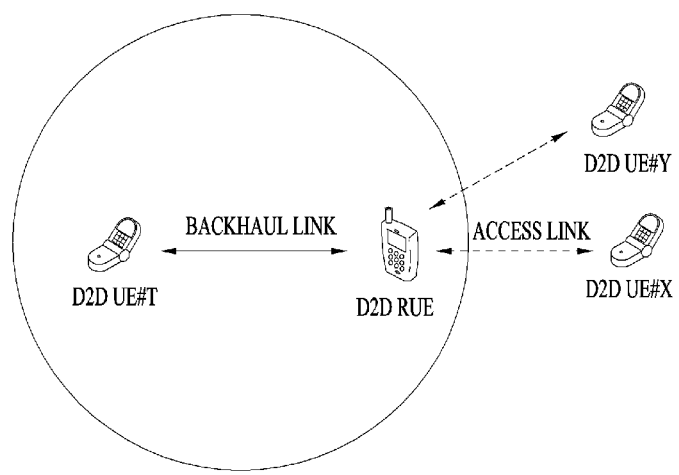
(b)

D2D RELAY METHOD OF TERMINAL IN WIRELESS COMMUNICATION SYSTEM, AND APPARATUS THEREFOR

This application is a 35 U.S.C. § 371 National Stage entry of International Application No. PCT/KR2015/009876 filed on Sep. 21, 2015, and claims priority to U.S. Provisional Application No. 62/053,202 filed Sep. 21, 2014, all of which are hereby incorporated by reference in their entireties as if fully set forth herein.

TECHNICAL FIELD

The present disclosure relates to a wireless communication system, and more particularly, to a method and apparatus for performing device-to-device (D2D) relay in a wireless communication system.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an evolved universal mobile telecommunications system (E-UMTS) which is an example of a wireless communication system. The E-UMTS is an evolved version of the conventional UMTS, and its basic standardization is in progress under the 3rd generation partnership project (3GPP). The E-UMTS may be referred to as a long term evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a user equipment (UE), base stations (eNode B; eNB), and an access gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments (UEs). Different cells may be set to provide different bandwidths. Also, one base station controls data transmission and reception for a plurality of UEs. The base station transmits downlink (DL) scheduling information of downlink data to the corresponding UE to notify the corresponding UE of time and frequency domains to which data will be transmitted and information related to encoding, data size, and hybrid automatic repeat and request (HARQ). Also, the base station transmits uplink (UL) scheduling information of uplink data to the corresponding UE to notify the corresponding UE of time and frequency domains that can be used by the corresponding UE, and information related to encoding, data size, and HARQ. An interface for transmitting user traffic or control traffic may be used between the base stations. A core network (CN) may include the AG and a network node or the like for user registration of the UE. The AG manages mobility of the UE on a tracking area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the UE, etc. are required.

DISCLOSURE

Technical Problem

An aspect of the present disclosure devised to solve the conventional problem is to provide a method and apparatus for performing device-to-device (D2D) relay in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a relay method of a first device-to-device (D2D) user equipment (UE) in a wireless communication system includes receiving a configuration for a D2D UE group to perform a single frequency network (SFN) relay, and performing the SFN relay using a first resource pool configured for the SFN relay. The first resource pool is configured to be different from a second resource pool configured for transmission of a D2D signal from the first D2D UE to a second D2D UE.

The D2D UE group may be configured based on a multicast broadcast single frequency network (MBSFN) area identifier (ID) for the SFN relay.

The first resource pool may be configured D2D UE group-specifically based on channel measurement information reported to a base station by the first D2D UE. The channel measurement information may be at least one of a received signal received power (RSRP), a reference signal received quality (RSRQ), or a received signal strength indicator (RSSI).

The configuration for the D2D UE group may include at least one of a group ID, information about resources for the SFN relay, information about a modulation and coding scheme (MCS) for the SFN relay, and information about a timing advance (TA) for the D2D UE group.

The D2D UE group may be configured in consideration of a wide area network (WAN) uplink timing of the first D2D UE.

The first UE may be a D2D relay UE performing mode 1 D2D communication.

The first D2D UE may be configured to transmit a scheduling assignment channel and a D2D data channel in SFN.

The first D2D UE may be a D2D relay UE performing mode 2 D2D communication.

In another aspect of the present disclosure, a first D2D UE for performing a relay in a wireless communication system includes a radio frequency unit, and a processor. The processor is configured to receive a configuration for a D2D UE group to perform an SFN relay, and perform the SFN relay using a first resource pool configured for the SFN relay, and the first resource pool is configured to be different from a second resource pool configured for transmission of a D2D signal from the first D2D UE to a second D2D UE.

Advantageous Effects

According to an embodiment of the present disclosure, device-to-device (D2D) relay can be performed efficiently in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 2 is a view illustrating the architecture of a control plane and a user plane of a radio interface protocol between a user equipment (UE) and an evolved UMTS terrestrial radio access network (E-UTRAN) conforming to a $3^{rd}$ generation partnership project (3GPP) radio access network standard;

FIG. 8 is a view referred to for describing device-to-device (D2D) communication (UE-to-UE communication);

FIG. 9 is a view illustrating an operation of a D2D relay UE (D2D RUE);

BEST MODE FOR CARRYING OUT THE INVENTION

Figure 1:
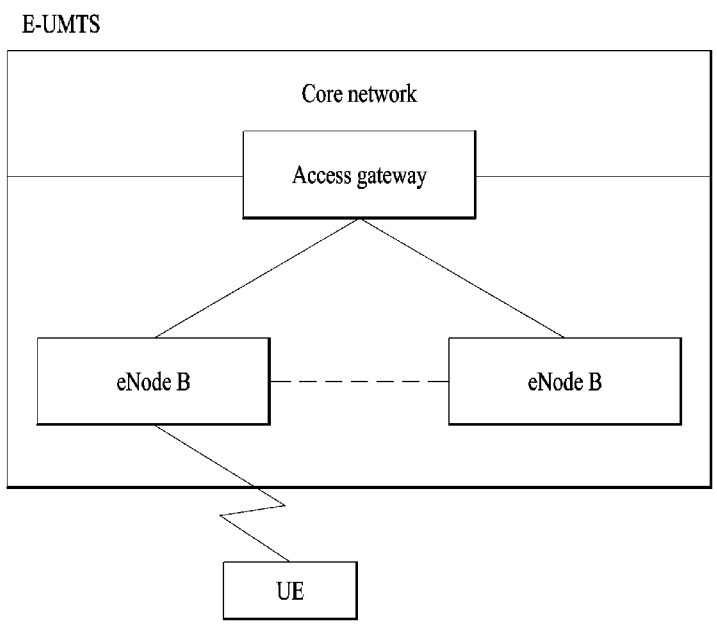
FIG. 1 is an exemplary view illustrating a network structure of an evolved universal mobile telecommunications system (E-UMTS) as an exemplary wireless communication system.

The following technology may be used for various wireless access technologies such as code division multiple access (CDMA), frequency division multiple access (FDMA), time division multiple access (TDMA), orthogonal frequency division multiple access (OFDMA), and single carrier frequency division multiple access (SC-FDMA). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink (DL) and SC-FDMA in an uplink (UL). LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a DL, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a DL or UL transmission service to several user equipments. At this time, different cells may be set to provide different bandwidths.

As DL transport channels carrying data from the network to the user equipment, there are provided a broadcast channel (BCH) carrying system information, a paging channel (PCH) carrying paging message, and a DL shared channel (SCH) carrying user traffic or control messages. Traffic or control messages of a DL multicast or broadcast service may be transmitted via the DL SCH or an additional DL multicast channel (MCH). Meanwhile, as UL transport channels carrying data from the user equipment to the network, there are provided a random access channel (RACH) carrying an initial control message and an UL shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
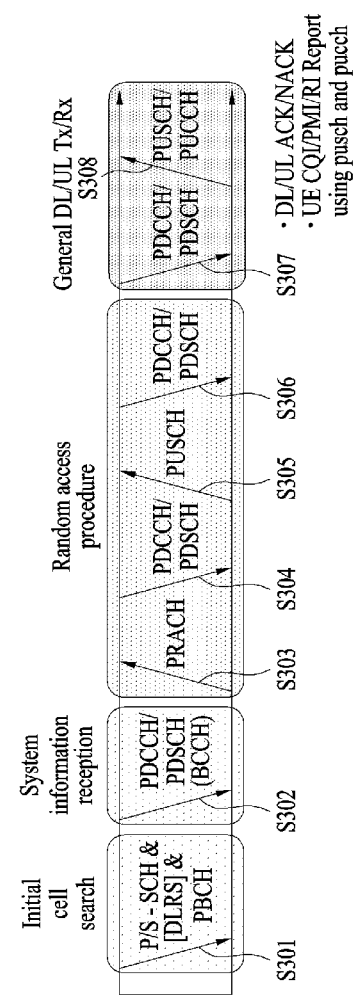
FIG. 3 is an exemplary view illustrating physical channels used in a 3GPP system and a general signal transmission method using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a DL channel status by receiving a DL reference signal (DL RS) at the initial cell search step.

The user equipment which has finished the initial cell search may acquire more detailed system information by receiving a physical DL shared channel (PDSCH) in accordance with a physical DL control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical DL control channel and the physical DL shared channel corresponding to the physical DL control channel.

The user equipment which has performed the aforementioned steps may receive the physical DL control channel (PDCCH)/physical DL shared channel (PDSCH) (S307) and transmit a physical UL shared channel (PUSCH) and a physical UL control channel (PUCCH) (S308), as a general procedure of transmitting UL/DL signals. Control information transmitted from the user equipment to the base station will be referred to as UL control information (UCI). The UCI includes hybrid automatic repeat and request acknowledgement/negative-ack (HARQ ACK/NACK), scheduling request (SR), channel state information (CSI), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes channel quality indicator (CQI), precoding matrix indicator (PMI), rank indication (RI), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
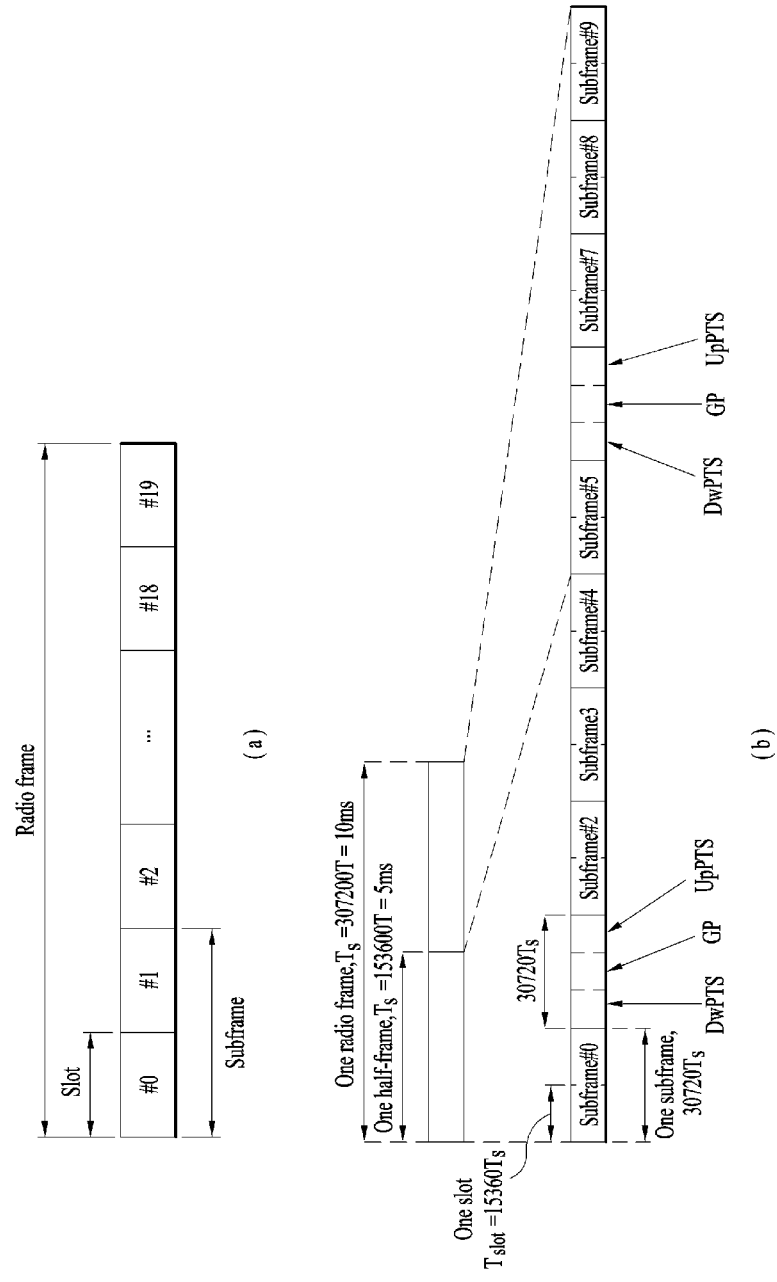
FIG. 4 is an exemplary view illustrating the structure of a radio frame used in a long term evolution (LTE) system.

FIG. 4 is a diagram illustrating a structure of a radio frame used in an LTE system.

Referring to FIG. 4, in a cellular OFDM radio packet communication system, UL/DL data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The DL radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a DL, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical DL control channel (PDCCH), and the other OFDM symbols may be allocated to a physical DL shared channel (PDSCH).

FIG. 4(b) is a diagram illustrating a structure of a type 2 radio frame. The type 2 radio frame includes two half frames, each of which includes four general subframes, which include two slots, and a special subframe which includes a DL pilot time slot (DwPTS), a guard period (GP), and an UL pilot time slot (UpPTS).

In the special subframe, the DwPTS is used for initial cell search, synchronization or channel estimation at the user equipment. The UpPTS is used for channel estimation at the base station and UL transmission synchronization of the user equipment. In other words, the DwPTS is used for DL transmission, whereas the UpPTS is used for UL transmission. Especially, the UpPTS is used for PRACH preamble or SRS transmission. Also, the guard period is to remove interference occurring in the UL due to multipath delay of DL signals between the UL and the DL.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

Figure 5:
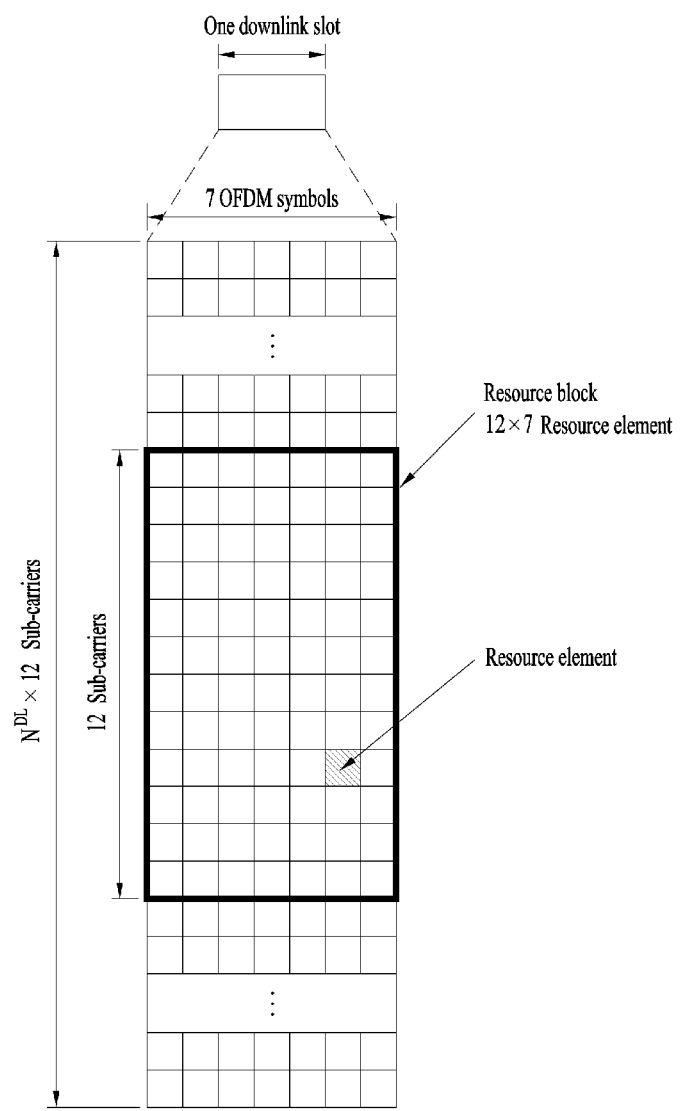
FIG. 5 is an exemplary view illustrating a resource grid for the duration of a downlink (DL) slot.

Referring to FIG. 5, a DL slot includes $N_{symb}^{DL}$ OFDM symbols in time domain and $N_{R3}^{DL}$ resource blocks. Since each of the resource blocks includes $N_{sc}^{RB}$ subcarriers, the DL slot includes $N_{RB}^{DL} \times N_{sc}^{RB}$ subcarriers in frequency domain. FIG. 5 shows one example that the DL slot includes 7 OFDM symbols and that the resource block includes 12 subcarriers, by which the present invention is non-limited. For instance, the number of OFDM symbols included in the DL slot can be modified according to a length of a cyclic prefix (CP).

Each element on a resource grid is called resource element (RE) and 1 single resource element is indicated by a single OFDM symbol index and a single subcarrier index. A single RB is configured with $N_{symb}^{DL} \times N_{sc}^{RB}$ resource elements. The number $N_{RB}^{DL}$ of resource blocks included in the DL slot is dependent on a DL transmission bandwidth configured in a cell.

Figure 6:
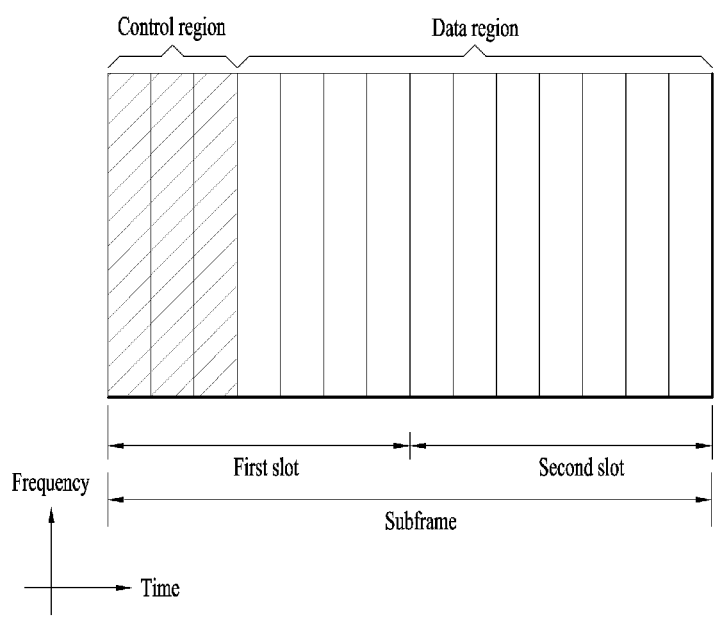
FIG. 6 is an exemplary view illustrating the structure of a DL radio frame in the LTE system.

FIG. 6 is a diagram illustrating a structure of a DL subframe.

TABLE 1

| | | Normal cyclic prefix in downlink | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, UL/DL configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the DL subframe, U means the UL subframe, and S means the special subframe. Also, Table 2 also illustrates a DL-UL switching period in the UL/DL subframe configuration of each system.

The structure of the aforementioned radio frame is only exemplary, and various modifications may be made in the number of subframes included in the radio frame, the number of slots included in the subframe, or the number of symbols included in the slot.

FIG. 5 is a diagram of a resource grid for a DL slot.

Referring to FIG. 6, maximum three (four) OFDM symbols located at the front of the first slot of the subframe correspond to a control region to which a control channel is allocated. The other OFDM symbols correspond to a data region to which a physical DL shared channel (PDSCH) is allocated. Examples of DL control channels used in the LTE system include a physical control format indicator channel (PCFICH), a physical DL control channel (PDCCH), and a physical hybrid ARQ indicator channel (PHICH). The PCFICH is transmitted from the first OFDM symbol of the subframe, and carries information on the number of OFDM symbols used for transmission of the control channel within the subframe. The PHICH carries HARQ ACK/NACK signals in response to UL transmission.

The control information transmitted through the PDCCH will be referred to as DL control information (DCI). The DCI includes resource allocation information for a user equipment or user equipment group. For example, the DCI includes UL/DL scheduling information, UL transmission (Tx) power control command, etc.

The PDCCH may include transport format and resource allocation information of a DL shared channel (DL-SCH), transport format and resource allocation information of an UL shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
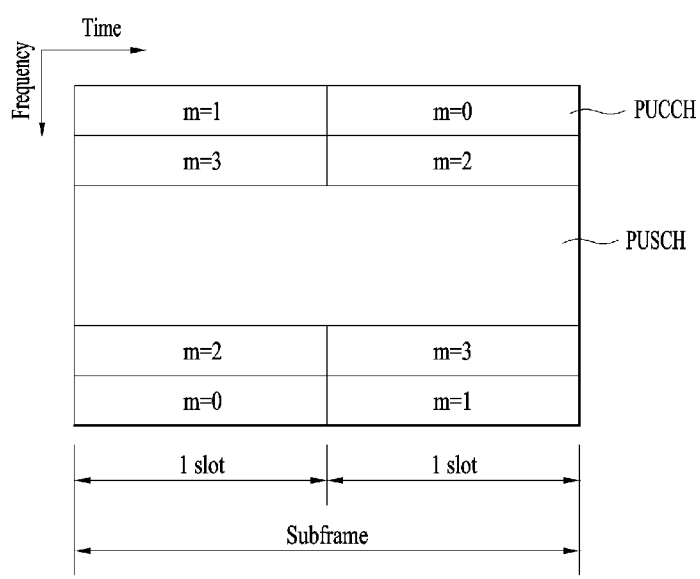
FIG. 7 is a view illustrating the structure of an uplink (UL) subframe in the LTE system.

FIG. 7 is a view illustrating an exemplary UL subframe structure in LTE.

Referring to FIG. 7, a UL subframe includes a plurality of (two) slots. A slot may include a different number of SC-FDMA symbols according to a CP length. The UL subframe is divided into a control region and a data region in the frequency domain. A PUSCH carrying user data such as voice is allocated to the data region. A PUCCH carrying UCI is allocated to the control region. The PUCCH includes an RB pair located at both ends of the data region along the frequency axis and hops over a slot boundary.

The PUCCH may carry the following control information.

Scheduling request (SR): information used to request UL-SCH resources. The SR is transmitted in on-off Keying (OOK).

HARQ ACK/NACK: a response signal to a DL data packet on a PDSCH. The HARQ ACK/NACK indicates whether the DL data packet has been received successfully. A 1-bit ACK/NACK is transmitted as a response to a single DL codeword and a 2-bit ACK/NACK is transmitted as a response to two DL codewords.

Channel state information (CSI): feedback information for a DL channel. The CSI includes a CQI, and multiple input multiple output (MIMO)-related feedback information includes an RI, a PMI, a precoding type indicator (PTI), and so on. The CSI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except for SC-FDMA symbols configured for transmitting RSs in the subframe. The last SC-FDMA symbol of a subframe configured to carry an SRS is additionally excluded from the SC-FDMA symbols available for transmission of the UCI. An RS is used for coherent detection of a PUCCH.

Now, a description will be given of device-to-device (D2D) communication (UE-to-UE communication).

D2D communication may or may not be network/coordination station (e.g., BS)-assisted.

Referring to FIG. 8, FIG. 8(a) illustrates a scheme in which a network/coordination station intervenes in transmission and reception of a control signal (e.g., a grant message), HARQ, CSI, and so on, and only data is transmitted and received between D2D UEs. FIG. 8(b) illustrates a scheme in which the network provides only minimal information (e.g., D2D connection information available in a corresponding cell), and D2D UEs establish a link and transmit and receive data via the link.

Based on the foregoing description, a method for efficiently transmitting/relaying data in single frequency network (SFN) by D2D relay UEs (D2D RUEs) according to the present disclosure will be described. SFN represents a (synchronized) single frequency network, which may be interpreted as transmission of predefined data (e.g., multicast and/or broadcast data) by a plurality of D2D RUEs (e.g., multimedia broadcast single frequency network (MBSFN)). D2D communication refers to communication between UEs on a direct radio channel. Although a UE is typically a terminal of a user, if network equipment such as an eNB transmits/receives a signal in a UE-to-UE communication scheme, the eNB may be regarded as a kind of UE to which the present disclosure is applicable.

FIG. 9 illustrates an exemplary operation of a D2D RUE. The D2D RUE provides a D2D UE outside the communication coverage of a specific network node (e.g., an eNB or a UE) with communication connectivity to the specific network node (FIG. 9(a)) or provides a D2D UE having difficulty in communication with the network node with communication connectivity to the specific network node (FIG. 9(b)). For this purpose, the D2D RUE maintains a communication link (access link, A_LINK) with another D2D UE as well as a communication link (backhaul link, B_LINK) with the specific network node.

While the proposed method will be described below in the context of a 3GPP LTE system for the convenience of description, the proposed method may be extended to other systems than the 3GPP LTE system.

Further, a UE that transmits a D2D signal is defined as a "D2D TX UE", and a UE that receives a D2D signal is defined as a "D2D RX UE", for the convenience of description.

Before a detailed description of the present disclosure, resource establishment/allocation for D2D communication will first be described.

In general, when a UE communicates with another UE on a direct radio channel, the UE may select a resource unit (RU) corresponding to specific resources from a resource pool being a set of contiguous resources, and transmits a D2D signal using the RU (i.e., a D2D TX UE operation). Then, the D2D RX UE receives information about the resource pool in which the D2D TX UE may transmit a signal by signaling, and detects the signal of the D2D TX UE in the resource pool. Herein, i) if the D2D TX UE is within the connection coverage of a cell, the cell may indicate the resource pool information, and ii) if the D2D TX UE is outside the connection coverage of the cell, another UE may indicate the resource pool information, or the resource pool may be determined to be predefined resources.

In general, a resource pool includes a plurality of RUs, and each UE may select one or more RUs and transmit its D2D signal in the selected RUs.

Figure 10:
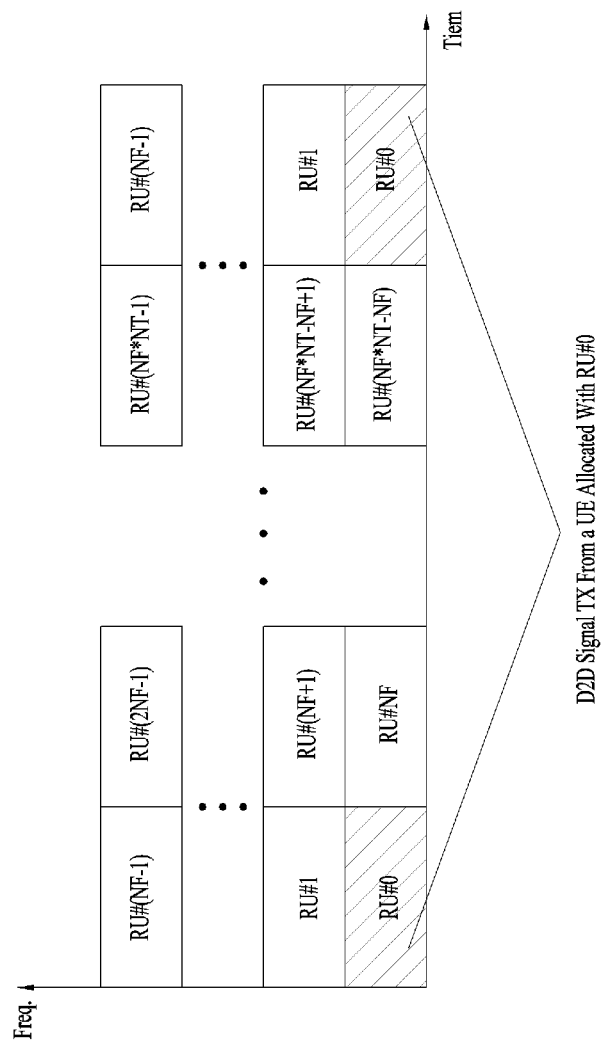
FIG. 10 is an exemplary view illustrating a resource unit (RU) configuration for D2D communication.

FIG. 10 is an exemplary view illustrating an RU configuration for D2D communication. In the illustrated case, a total of NF×NT RUs are defined by dividing total frequency resources by NF and dividing total time resources by NT. It may be said that the resource pool is repeated every NT subframes. Characteristically, one RU may occur repeatedly periodically as illustrated in FIG. 10. Or to achieve diversity in time or frequency, the index of a physical RU to which a logical RU is mapped may vary over time in a predetermined pattern. In this RU structure, a resource pool may mean a set of RUs available for D2D signal transmission of a D2D TX UE.

Resource pools may be categorized into a plurality of types. First, the resources pools may be classified according to the content of D2D signals. For example, the content of D2D signals may be classified as follows, and a resource pool may be configured for each D2D content type.

Scheduling assignment (SA): a signal including information about the position of resources that each D2D TX UE uses for transmission of a subsequent D2D data channel, a modulation and coding scheme (MCS) required for demodulation of the data channel, a MIMO transmission scheme for the data channel, and so on. This signal may be transmitted multiplexed with D2D data in the same RU. In this case, an SA resource pool may mean a resource pool in which an SA is transmitted multiplexed with D2D data. For the convenience of description, a predefined (or signaled) resource set used for transmission and/or reception of an SA signal is defined as an 'SA resource pool', and a channel carrying the SA signal is defined as an 'SA channel'.

D2D data channel: a pool of resources indicated by an SA, which a D2D TX UE uses for transmission of user data. If it is possible to transmit D2D data multiplexed with SA information in the same RU, only the D2D data channel except for the SA information may be transmitted in a resource pool configured for the D2D data channel. In other words, an RE used for transmission of the SA information in an individual RU of the SA resource pool is still used for transmission of D2D data in the resource pool of the D2D data channel. For the convenience of description, a predefined (or signaled) resource set used for transmission and/or reception of D2D data will be referred to as a 'data channel resource pool'.

Discovery message: a resource pool for a message in which a D2D TX UE transmits information such as its ID or the like so that an adjacent UE may discover the D2D TX UE. For the convenience of description, for example, a predefined (or signaled) resource set used for transmission and/or reception of a discovery message will be referred to as a 'discovery resource pool'.

As described before, even though D2D signals include the same type of content, different resource pools may be used according to the transmission/reception properties of the D2D signals. For example, for D2D data channels or discovery messages, different resource pools may further be defined depending on i) transmission timing determination schemes (e.g., transmission at the reception time of a reference synchronization signal, and transmission by applying a predetermined timing advance (TA) to the reception time of a reference synchronization signal) for the D2D signals, ii) resource allocation schemes (e.g., indication of transmission resources for an individual signal to an individual D2D TX UE by a cell, and autonomous selection of transmission resources for an individual signal from a pool by an individual D2D TX UE) for the D2D signals, or iii) the signal formats of the D2D signals (e.g., the number of symbols that each D2D signal occupies in one subframe or the number of subframes used for transmission of one D2D signal).

Further, resources may be allocated for transmission of a D2D data channel in the following two modes.

Mode 1: a cell directly indicates resources for use in transmission of an SA and D2D data to an individual D2D TX UE. As a result, the cell may have accurate knowledge of which UE will use which resources for D2D signal transmission. However, if the cell indicates D2D resources for transmission of every D2D signal, excessive signaling overhead may be incurred. Accordingly, the cell may allocate a plurality of SAs and/or data transmission resources by one signaling.

Mode 2: an individual D2D TX UE selects appropriate resources from a contiguous SA and data resource pool configured for a plurality of D2D TX UEs by a cell, and transmits an SA and data in the selected resources. As a result, the cell may not have accurate knowledge of which UE will use which resources for D2D signal transmission.

Resources for transmission of a discovery message may be allocated in the following two types.

TYPE 1: a discovery procedure in the case of non UE-specific resource allocation for transmission of a discovery signal. Herein, resources may be for all UEs or a group of UEs.

TYPE 2: a discovery procedure in the case of UE-specific resource allocation for transmission of a discovery signal.

TYPE 2A: resources are allocated at a specific transmission instance of each discovery signal.

TYPE 2B: resources are allocated semi-persistently for transmission of a discovery signal.

Figure 11:
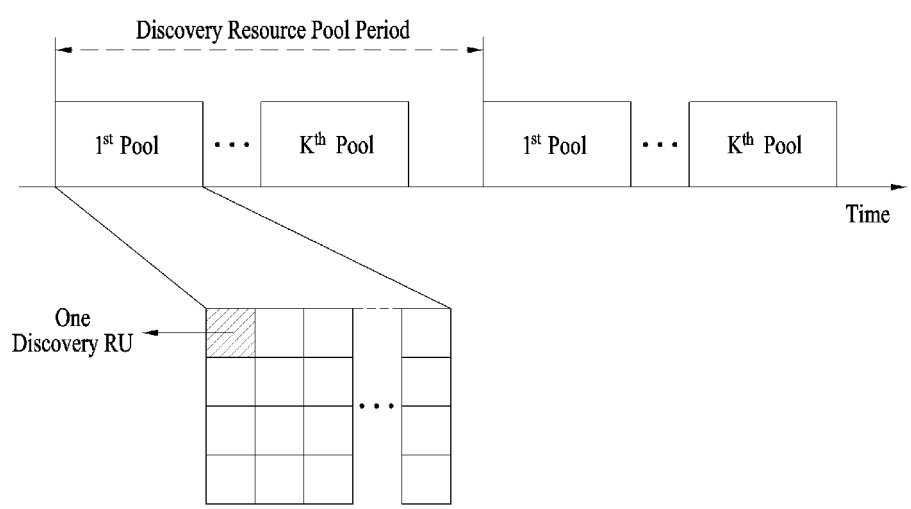
FIG. 11 is a view illustrating a resource pool related to a discovery message.

FIG. 11 illustrates periodic occurrences of a discovery message-related resource pool (i.e., 'discovery resource pool'). In FIG. 11, the occurrence period of the resource pool is written as a 'discovery resource pool period'. In FIG. 11, among a plurality of discovery resource pools configured within one discovery resource pool period, a specific discovery resource pool(s) may be defined as a serving cell-related discovery transmission/reception resource pool(s), and the other discovery resource pool(s) may be defined as a neighbor cell-related discovery reception resource pool(s).

Figure 12:
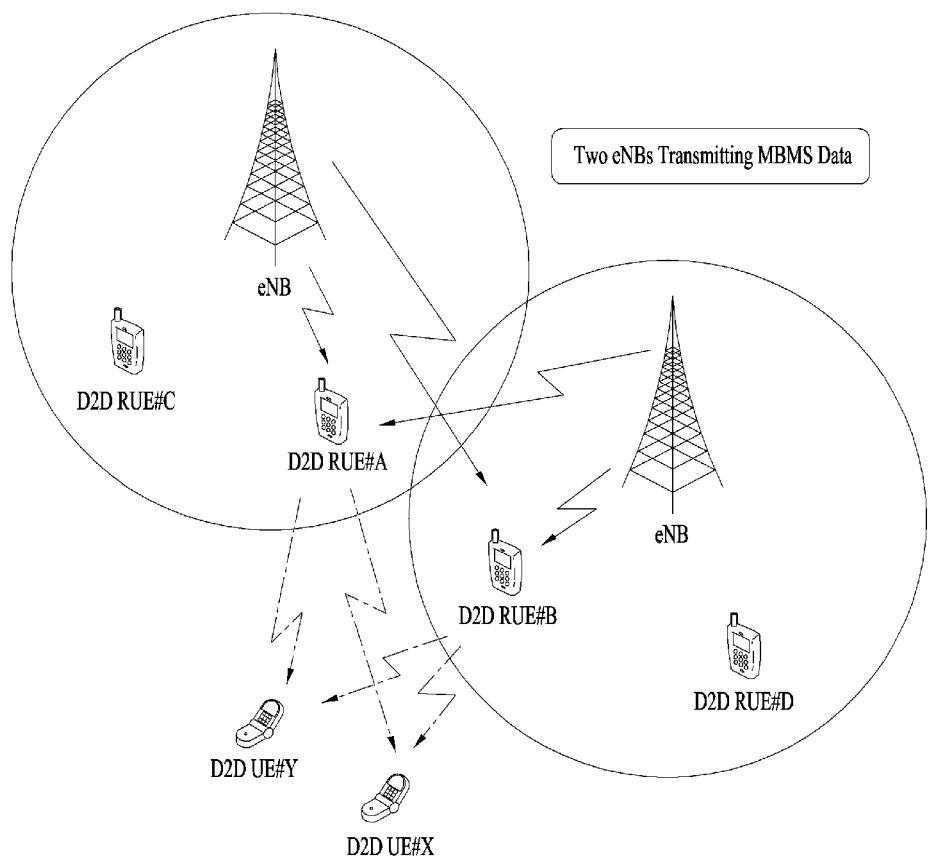
FIG. 12 is a view illustrating an operation of D2D RUEs for relaying received multimedia broadcast multicast service (MBMS) data in single frequency network (SFN)

FIG. 12 is an exemplary view illustrating an operation of D2D RUEs for relaying received multimedia broadcast multicast service (MBMS) data in single frequency network (SFN). In FIG. 12, on the assumption that two eNBs are participating in an MBSFN operation, D2D RUE#A and D2D RUE#B relay MBMS data received at a specific time of MBSFN SF#N in specific UL resources after the time of SF#N in SFN according to a predefined rule/configuration. Therefore, D2D UE#X and D2D UE#Y outside the communication coverage of the two eNBs participating in the MBSFN operation receive the MBMS data relayed by D2D RUE#A and D2D RUE#B. Additionally, in FIG. 12, D2D RUE#C may be a D2D RUE that does not receive MBMS data or a D2D RUE that receives MBMS data but does not perform an MBMS data relay operation. D2D UE#D may be a D2D UE that does not receive MBMS data or a D2D RUE that receives MBMS data.

Hereinbelow, the present disclosure proposes methods for efficiently relaying/transmitting data in SFN by D2D RUEs. It may be configured that embodiments of the present disclosure are applied restrictively to an operation for relaying multicast and/or broadcast data received through an MBSFN operation of eNBs.

For the convenience of description, an SFN-based data relay operation of D2D RUEs is referred to as 'SFN_RELAY'. Embodiments of the present disclosure (i.e., first to fourth embodiments) may be extended to each other.

Embodiment 1

Resources required for supporting SFN_RELAY may be configured independently of (e.g., differently from) the legacy D2D signal-related resources (e.g., an 'SA resource pool', a 'data channel resource pool', a 'discovery signal resource pool', and a 'D2DSS resource pool') described before with reference to FIGS. 9 and 10. The resources required for supporting SFN_RELAY include at least an SFN_RELAY-related 'SA resource pool' or 'data channel resource pool'. For the convenience of description, these resources are defined as "SFN_RES_POOL". For example, SFN_RES_POOL information (e.g., a period, a bitmap related to the positions of configured subframes, the number of configured RBs, and the starting position of the configured RBs) may be i) indicated by a predefined signal (e.g., an SIB, an RRC signal, or a PD2DSCH) or ii) preset. For example, if the first embodiment of the present disclosure is applied, effects such as mutual interference between radio resources for D2D communication and radio resources for SFN_RELAY may be reduced.

In another example, the SFN_RES_POOL information may be configured i) on an (SFN_RELAY-related) 'MBSFN area ID' (e.g., MBSFN RS sequence generation-related input parameter) group basis, ii) on an SFN_RELAY-related group ID basis (as described in Embodiment 2 below), or iii) independently (or differently) as a 'D2D communication resource pool'-specific form. The term, MBSFN area represents an area in which eNBs transmitting the same content to a UE are located so that the UE may combine received signals (i.e., perform MBSFN combining).

In another example, the SFN_RES_POOL information (hereinafter, referred to as SET_ SFN) may be configured i) to be overlapped at least partially with legacy D2D signal-related resources (hereinafter, referred to as SET_ORI), ii) to be in the relationship of 'SET_SFN⊂SET_ORI', or iii) to be in the relationship of 'SET_SFN⊆SET_ORI'. It may be assumed that an SFN_RELAY-related signal and a legacy D2D signal are multiplexed, or only an SFN_RELAY-related signal is transmitted/received.

In another example, the SFN_RES_POOL information may be configured UE (group)-specifically, in consideration of at least one of predefined RS-related (modified) reference signal received powers (RSRPs), reference signal received qualities (RSRQs), or reference signal strength indicators (RSSIs) reported by D2D RUEs. An RS serving this usage may be defined as cell-specific reference signal (CRS), channel state information-reference signal (CSI-RS), or MBSFN RS. In other words, mutual interference between D2D RUE groups having different propagation delay characteristics may be reduced by independently (differently) configuring SFN_RES_POOL information on a D2D RUE group basis in consideration of at least one of the RSRPs/RSRQs/RSSIs (reported by the D2D RUE(s)).

Embodiment 2

An eNB may be configured to select a specific D2D RUE group related to SFN_RELAY in consideration of information about predefined RS-related (modified) RSRPs, RSRQs, or RSSIs reported by D2D RUEs, and indicate related information (e.g., a group ID, information about resources/an MCS to be used for SFN_RELAY, and a representative TA value for the specific D2D RUE group) to the specific D2D RUE group. D2D RUEs that have reported similar (modified) RSRPs, RSRQs, or RSSIs may be selected as the same D2D RUE group related to SFN_RELAY, and an RS serving this usage may be defined as CRS, CSI-RS, or MBSFN RS.

In another example, an eNB may be configured to select a specific D2D RUE group related to SFN_RELAY in consideration of rough WAN UL timings of D2D RUEs, and indicate related information (e.g., a group ID, information about resources/an MCS to be used for SFN_RELAY, and a representative TA for the specific D2D RUE group) to the specific D2D RUE group. Further, it may be defined that D2D RUEs that have similar WAN UL timings may be selected as the same D2D RUE group related to SFN_RELAY, and the D2D RUEs of the same D2D RUE group use a representative TA value for the specific D2D RUE group in transmitting an SA channel, and/or transmitting a data channel, and/or setting a value in the TA field of the SA channel.

In another example, it may be configured that a specific D2D RUE group related to SFN_RELAY is implicitly (independently/autonomously) formed based on whether D2D RUEs satisfy a predefined or signaled condition. For example, it may be configured that at least one of an 'SFN_RES_POOL'-specific (modified) RSRP, RSRQ, RSSI, or TA value, or a group ID is defined or signaled and D2D RUEs perform SFN_RELAY using an SFN_RES_POOL linked to their information or values closest to their information.

In another example, it may be configured that 'SFN_RELAY-related resources' (e.g., a time-resource pattern type (T-RPT) and frequency resources)-specific (modified) RSRP, RSRQ, RSSI, or TA value, or a group ID is defined or signaled, and D2D RUEs perform SFN_RELAY using SFN_RELAY-related resources linked to their information or values closest to their information. According to this operation, D2D RUEs that select the same SFN_RES_POOL or the same SFN_RELAY-related resources may be determined to be the same D2D RUE group.

In another example, if D2D RUEs receive a predefined MBMS data relay/reception request message from at least one D2D UE that conduct D2D communication with the D2D RUEs, the D2D RUEs may report related information (e.g., information about IDs of D2D UEs that want MBMS data relay/reception or an indication indicating existence of D2D UEs that want MBMS data relay/reception) to an eNB, and the eNB may configure a specific D2D RUE group only in consideration of these D2D RUEs.

Information about an SFN_RELAY-related D2D RUE group (e.g., a group ID, information about resources/an MCS to be used for SFN_RELAY, and a representative TA value for the corresponding specific D2D RUE group) may be defined 'D2D communication resource pool'-specifically. In a specific example, if the SFN_RELAY-related D2D RUE group ID information is indicated 'D2D communication resource pool'-specifically, this means that the same SFN_RELAY-related D2D RUE group includes only D2D RUEs for which the same 'D2D communication resource pool' is configured or used.

In another example, D2D RUEs that will perform SFN_RELAY may be limited to at least one of i) D2D RUEs each having at least one of a predefined RS-related (modified) RSRP, RSRQ, or RSSI greater than a pre-signaled or predefined threshold, ii) D2D RUEs that have received a predefined MBMS data relay/reception request message from at least one D2D UE that conducts D2D communication with the D2D RUEs, and/or iii) D2D RUEs that have received MBMS data through an MBSFN operation of eNBs.

Embodiment 3

A D2D RUE that conducts 'mode 1 D2D communication' (hereinafter, referred to as 'MODE1_CM) may be configured to perform SFN_RELAY according to at least one of the following Rule #3-A to Rule #3-C. Further, the third embodiment may be extended to SFN_RELAY of D2D RUEs that conduct 'mode 2 D2D communication' as well as SFN_RELAY of D2D RUEs that conduct MODE1_CM.

Rule #3-A: the start of SFN_RELAY at a specific time instant and/or information about resources to be used for SFN_RELAY (e.g., an SA resource index and data RB allocation) may be indicated to a specific D2D RUE group configured according to a predefined configuration by a predefined signal (hereinafter, referred to as 'SFN_RSIG'). Herein, SFN_RSIG may be defined as DCI having the same size (and/or field configuration) as that of a legacy D2D grant format (i.e., prevent an increase in the number of blind decodings).

Specifically, if SFN_RSIG is defined as DCI having the same size as the legacy D2D GRANT format (DCI format 0), i) some fields may be set to predefined values (i.e., available as a virtual CRC), or ii) the DCI may be decoded based on a new signaled or defined RNTI (e.g., an independent (e.g., different) RNTI for each D2D RUE group) other than a legacy D2D RNTI.

In an example of setting some fields to predefined values, a 'Hopping Flag'-related field may be fixed to 0. In another example, SFN_RSIG may be defined as a signal in a format independent of (e.g., different from) a legacy D2D grant format (e.g., DCI having a different size and/or a different field configuration (e.g., a different Group ID field) from the legacy D2D grant format).

Rule #3-B: a D2D RUE group that will perform SFN_RELAY may be configured to transmit a related SA channel as well as a data channel in SFN. Resources related to the SA channel transmitted in SFN may be configured in at least a part (i.e., all or a part) of the methods of Rule #3-A.

In a specific example, the same 'SA RESOURCE INDEX' information of an SFN SIG may be configured for a D2D RUE group that will perform an SFN_RELAY operation. By applying this method, for example, the data channel and the SA channel transmitted in SFN may have similar coverage.

In another example, a resource pool related to SFN-based SA channel transmission/reception may be configured independently of SFN-based data channel transmission/reception-related resource pool according to at least a part (i.e., all or a part) of the methods in the foregoing first embodiment.

In another example, a D2D RUE group that will perform SFN_RELAY may be configured to transmit only a data channel in SFN and an SA channel in non-SFN (e.g., it may be interpreted that the SA channel achieves as much an SFN performance gain as 'Best Effort').

Rule #3-C: D2D RUEs that will perform SFN_RELAY may set the value of a TA field on an SA channel (related to transmission of a corresponding data channel) to a predefined or signaled value. For example, the value of the TA field may be set to 0. In this case, this value may be used as a virtual CRC.

This rule may relieve the problem that a D2D RX UE receives data channels beyond a predefined allowed RX timing difference threshold due to setting of the values of TA fields on different SA channels of MODE1_CM D2D RUEs that will perform SFN_RELAY (i.e., setting of the values of TA fields based on WAN UL timings of the MODE1_CM D2D RUEs).

For example, a TA value may be configured or signaled 'MODE1_CM resource pool'-specifically, and D2D RUEs that perform MODE1_CM based on the same 'MODE1_CM resource pool' may be configured to perform at least one of i) transmission of an SA channel related to SFN_RELAY, ii) setting of the value of a TA field on the SA channel, or iii) transmission of a data channel, according to a TA value linked to the 'MODE1_CM resource pool'.

In another example, an 'SA resource'-specific TA value may be pre-signaled or predefined, and D2D RUEs that will perform SFN_RELAY may be configured to transmit an SA channel in SA resources having a TA value closest to their MODE1_CM-related TA values (i.e., set based on their WAN UL timings). In this case, the SA channel may be transmitted in specific SA resources according to a TA value linked to the specific SA resources, and/or the value of the TA field on the SA channel transmitted in the specific SA resources may be set to the TA value linked to the specific SA resources. Accordingly, this rule is effective for SFN-based transmission of an SA channel as described in Rule #3-B.

In another example, a data channel-specific TA value may be pre-signaled or predefined, and D2D RUEs that will perform SFN_RELAY may be configured to transmit a data channel in data channel resources having a TA value closest to their data channel-related TA values. In this case, the data channel may be transmitted in specific data channel resources according to a TA value linked to the specific data channel resources. If this rule is applied, a D2D RUE(s) having the same TA value (or a TA value within a predefined or signaled error (difference) threshold) may perform SFN_RELAY on the same data channel. Therefore, a D2D UE(s) may receive the corresponding SFN_RELAY information with relatively slight interference (or within an error range).

In another example, D2D RUEs that perform SFN_RELAY for MBMS data received through an MBSFN operation of eNBs may set the value of an MCS field on an SA channel related to transmission of a corresponding data channel to an MCS value related to a physical multicast channel (PMCH).

In another example, D2D RUEs that will perform SFN_RELAY may set the value of an ID field on an SA channel (related to transmission of a corresponding data channel) to a predefined or signaled specific value, so that D2D RX UEs may be aware that the SA channel/data channel is transmitted by SFN_RELAY. For example, the D2D RUEs that will perform SFN_RELAY may set the value of an ID field on the SA channel (related to the transmission of the data channel) to a group ID value (related to SFN_RELAY) as described in the second embodiment.

In another example, D2D RUEs that will perform SFN_RELAY may be configured to set i) the value of a 'T-RPT Index' field or ii) the value of a 'Frequency Resource' field on an SA channel (related to a corresponding data channel) to a value within predefined or signaled candidates (or areas). For example, SFN_RELAY may be performed only within predefined or signaled T-RPT candidates or frequency resource areas. The T-RPT candidates or frequency resource areas may be configured i) independently (e.g., differently) on an MBSFN area ID (group) basis, ii) independently (e.g., differently) an SFN_RELAY-related group ID basis (as described in the second embodiment), iii) 'MODE1_CM resource pool'-specifically, or iv) UE (group)-specifically based on at least one of predefined RS-related (modified) RSRPs, RSRQs, or RSSIs reported by D2D RUEs.

Additionally, D2D RUEs that will perform SFN_RELAY may be configured to fix the value of a 'Frequency Hopping Indicator' field on an SA channel (related to transmission of a corresponding data channel) to a predefined value. For example, if the value of the 'Frequency Hopping Indicator' field is set to '0', it may be used as a virtual CRC.

Embodiment 4

It may be defined that a D2D RUE conducting 'mode 2 D2D communication' (hereinafter, referred to as 'MODE2_CM') performs SFN_RELAY according to the following Rule #4-A to Rule #4-C. The fourth embodiment may be extended to SFN_RELAY of D2D RUEs performing MODE1_CM as well as SFN_RELAY of D2D RUEs performing MODE2_CM.

Rule #4-A: D2D RUEs that will perform SFN_RELAY (according to whether a predefined condition is satisfied) may be configured to perform SFN_RELAY in a pre-signaled or predefined SFN_RES_POOL or resources related to SFN_RELAY (e.g., a T-RPT or frequency resources).

The SFN_RES_POOL or the SFN_RELAY-related resources may be configured i) differently on a (SFN_RELAY-related) group ID basis, ii) differently on an MBSFN area ID (group) basis, or iii) 'MODE2_CM resource pool'-specifically, as described before in the second embodiment.

D2D RUEs that will perform SFN_RELAY may be limited to i) D2D RUEs each having at least one of a predefined RS-related (modified) RSRP, RSRQ, or RSSI greater than a pre-signaled or predefined threshold, and/or ii) D2D RUEs that have received a predefined MBMS data relay/reception request message from at least one D2D UE that conducts D2D communication with the D2D RUEs (i.e., refer to the second embodiment), and/or iii) D2D RUEs that have received MBMS data (through an MBSFN operation of eNBs).

Rule #4-B: a D2D RUE group that will perform SFN_RELAY may be configured to transmit a related SA channel as well as a data channel in SFN (similarly to Rule #3-B).

An SFN-based SA channel transmission/reception-related resource pool may be configured independently of an SFN-based data channel transmission/reception-relayed resource pool in at least a part (i.e., all or a part) of the methods according to the first embodiment. The data channel and SA channel transmitted in SFN may have similar coverage by applying this method.

In another example, a D2D RUE group that will perform SFN_RELAY may be configured to transmit only a data channel in SFN and an SA channel in non-SFN (e.g., the SA channel achieves as much an SFN performance gain as 'Best Effort').

Rule #4-C: D2D RUEs that will perform SFN_RELAY may set the value of a TA field on an SA channel (related to transmission of a corresponding data channel) to a predefined or signaled value. If the value of the TA field is set to '0', it may be used as a virtual CRC.

For example, a TA value may be set or signaled 'MODE2_CM resource pool'-specifically, and D2D RUEs performing MODE2_CM based on the same MODE2_CM resource pool may be configured i) to transmit an SFN_RELAY-related SA channel and/or ii) to set the value of the TA field on the SA channel, and/or iii) to transmit a data channel, according to a TA value linked to the MODE2_CM resource pool.

In another example, in MODE2_CM, the TA field on the SA channel may be redefined/reused for the usage of transmitting SFN_RELAY-related information, not TA information.

For example, the TA field of the SA channel may be used i) to indicate that the SA channel and/or the (related) data channel is a signal related to SFN_RELAY, and/or i) to indicate information about a group ID of corresponding D2D RUEs transmitting signals related to SFN_RELAY.

In another example, D2D RUEs performing SFN_RELAY for MBMS data received through an MBSFN operation of eNBs may set the value of an MCS field on an SA channel (related to transmission of a corresponding data channel) to a PMCH-related MCS value.

In another example, D2D RUEs that will perform SFN_RELAY may set the value of an ID field on an SA channel (related to transmission of a corresponding data channel) to a predefined or signaled specific value, so that D2D RX UEs may be aware that the SA channel/data channel is transmitted by SFN_RELAY. For example, the D2D RUEs that will perform SFN_RELAY may set the value of the ID field on the SA channel (related to the transmission of the data channel) to a group ID value related to SFN_RELAY as described in the second embodiment.

In another example, D2D RUEs that will perform SFN_RELAY may be configured to set the value of a 'T-RPT Index' field or ii) a 'Frequency Resource' field on an SA channel (related to transmission of a corresponding data channel) to a value within predefined or signaled candidates (or areas). In this case, it may be interpreted that SFN_RELAY is performed only within predefined or signaled T-RPT candidates or frequency resource areas.

The T-RPT candidates or frequency resource areas may be configured i) independently (e.g., differently) on an MBSFN area ID (group) basis, ii) independently (e.g., differently) on an SFN_RELAY-related group ID basis (as described in the second embodiment), iii) 'MODE2_CM resource pool'-specifically, or iv) UE (group)-specifically based on at least one of predefined RS-related (modified) RSRPs, RSRQs, or RSSIs reported by D2D RUEs.

Additionally, D2D RUEs that will perform SFN_RELAY may be configured to fix the value of a 'frequency hopping indicator' field on an SA channel (related to transmission of a corresponding data channel) to a predefined value (e.g., 0) (i.e., available as a virtual CRC).

The embodiments/configurations/rules/methods of the present disclosure as described above may be implemented independently to realize the present disclosure. When the embodiments of the present disclosure are implemented in at least one combination, they should also be determined to be one form of the present disclosure.

Further, the above-described embodiments of the present disclosure may be extended to i) a case where some of D2D UEs participating in D2D communication are within network coverage, and the other D2D UEs are outside the network coverage (D2D discovery/communication of partial network coverage), and/or ii) a case where all of D2D UEs participating in D2D communication are within network coverage (D2D discovery/communication within network coverage), and/or iii) a case where all of D2D UEs participating in D2D communication are outside network coverage (D2D discovery/communication outside network coverage (for public safety only)).

The above-described embodiments of the present disclosure may be configured to be applied restrictively to transmission of a discovery message, a D2D data channel, or an SA in a specific type/mode.

Figure 13:
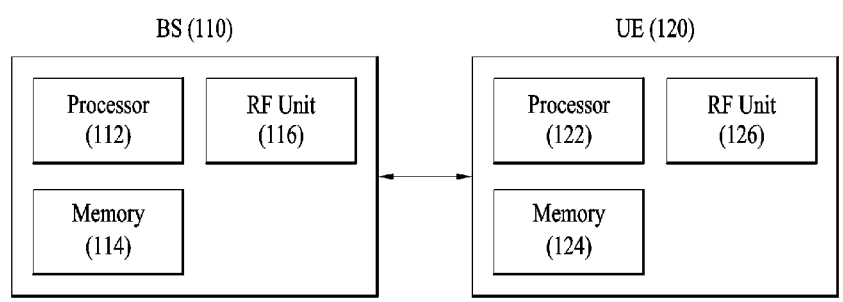
FIG. 13 is a block diagram of a base station (BS) and a UE which are applicable to an embodiment of the present disclosure.

FIG. 13 is a block diagram of a BS and a UE which are applicable to an embodiment of the present disclosure.

If a relay is included in a wireless communication system, communication is conducted between a BS and the relay via a backhaul link, and communication is conducted between the relay and a UE via an access link. Hence, the BS or the UE illustrated in FIG. 13 may be replaced with the relay under circumstances.

Referring to FIG. 13, a wireless communication system includes a BS 110 and a UE 120. The BS 110 includes a processor 112, a memory 114, and a radio frequency (RF) unit 116. The processor 112 may be configured to perform the procedures and/or methods proposed in the present disclosure. The memory 114 is connected to the processor 112 and stores various kinds of information related to an operation of the processor 112. The RF unit 116 is connected to the processor 112 and transmits and/or receives a radio signal. The UE 120 includes a processor 122, a memory 124 and an RF unit 126. The processor 122 may be configured to perform the procedures and/or methods proposed in the present disclosure. The memory 124 is connected to the processor 122 and stores various kinds of information related to an operation of the processor 122. The RF unit 126 is connected to the processor 122 and transmits and/or receives a radio signal. The BS 110 and/or the UE 120 may have a single antenna or multiple antennas.

The embodiments of the present disclosure described above are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a specific operation described as being performed by a BS may be performed by an upper node of the BS. Namely, it is apparent that, in a network comprised of a plurality of network nodes including a BS, various operations performed for communication with a UE may be performed by the BS, or network nodes other than the BS. The term, BS may be replaced with a fixed station, a Node B, an eNode B (eNB), an access point, and so on.

Embodiments of the present disclosure may be achieved by various means, for example, hardware, firmware, software, or a combination thereof. In a hardware configuration, an embodiment of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and so on.

In a firmware or software configuration, an embodiment of the present disclosure may be implemented in the form of a module, a procedure, a function, and so on performing the above-described functions or operations. A software code may be stored in a memory unit and executed by a processor. The memory unit may be located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the method and apparatus for performing D2D relay in a wireless communication system have been described in the context of a 3GPP LTE system, they are also applicable to various wireless communication systems other than the 3GPP LTE system.

The invention claimed is:

1. A relay method of a device-to-device (D2D) user equipment (UE) in a wireless communication system, the relay method comprising:
receiving information related to resource pools for a single frequency network (SFN) relay;
receiving a configuration including a first D2D UE group identification (ID) for the SFN relay; and
performing the SFN relay based on one of the resource pools,
wherein, when the resource pools include a first resource pool related to the first D2D UE group ID, the SFN relay is performed based on the first resource pool,
wherein, when the resource pools do not include the first resource pool, the SFN relay is performed based on a second resource pool related to a second D2D UE group ID nearest to the first D2D UE group ID among the resource pools, and
wherein the resource pools for the SFN relay are configured to be different from resource pools for transmission of a D2D signal.

2. The relay method according to claim 1, wherein the D2D UE group ID is configured based on a multicast broadcast single frequency network (MBSFN) area identifier (ID) for the SFN relay.

3. The relay method according to claim 1, wherein the resource pools are configured for a D2D UE group based on channel measurement information reported to a base station by the D2D UE.

4. The relay method according to claim 3, wherein the channel measurement information is at least one of a received signal received power (RSRP), a reference signal received quality (RSRQ), or a received signal strength indicator (RSSI).

5. The relay method according to claim 1, wherein the D2D UE group ID is configured based on a wide area network (WAN) uplink timing of the D2D UE.

6. The relay method according to claim 1, wherein the D2D UE is a D2D relay UE performing mode 1 D2D communication.

7. The relay method according to claim 1, wherein the D2D UE is configured to transmit a scheduling assignment channel and a D2D data channel in an SFN.

8. The relay method according to claim 1, wherein the D2D UE is a D2D relay UE performing mode 2 D2D communication.

9. A device-to-device (D2D) user equipment (UE) for performing a relay in a wireless communication system, the D2D UE comprising:
- a radio frequency (RF) unit; and
- a processor, operatively coupled to the radio frequency unit,
- wherein the processor is configured to:
- control the RF unit to receive information related to resource pools for a single frequency network (SFN) relay;
- control the RF unit to receive a configuration including a D2D UE group identification (ID) for the SFN relay; and
- performing the SFN relay based on one of the resource pools;
- wherein, when the resource pools include a first resource pool related to the first D2D UE group ID, the SFN relay is performed based on the first resource pool,
- wherein, when the resource pools do not include the first resource pool, the SFN relay is performed based on a second resource pool related to a second D2D UE group ID nearest to the first D2D UE group ID among the resource pools, and
- wherein the resource pools for the SFN relay are different from resource pools for transmission of a D2D signal.

* * * * *